Jan. 23, 1962 S. E. ZOCHOLL 3,018,434
BAR LINKAGE FOR VOLTAGE COMPENSATED PHASE SHIFTER
Filed Oct. 29, 1957 3 Sheets-Sheet 1
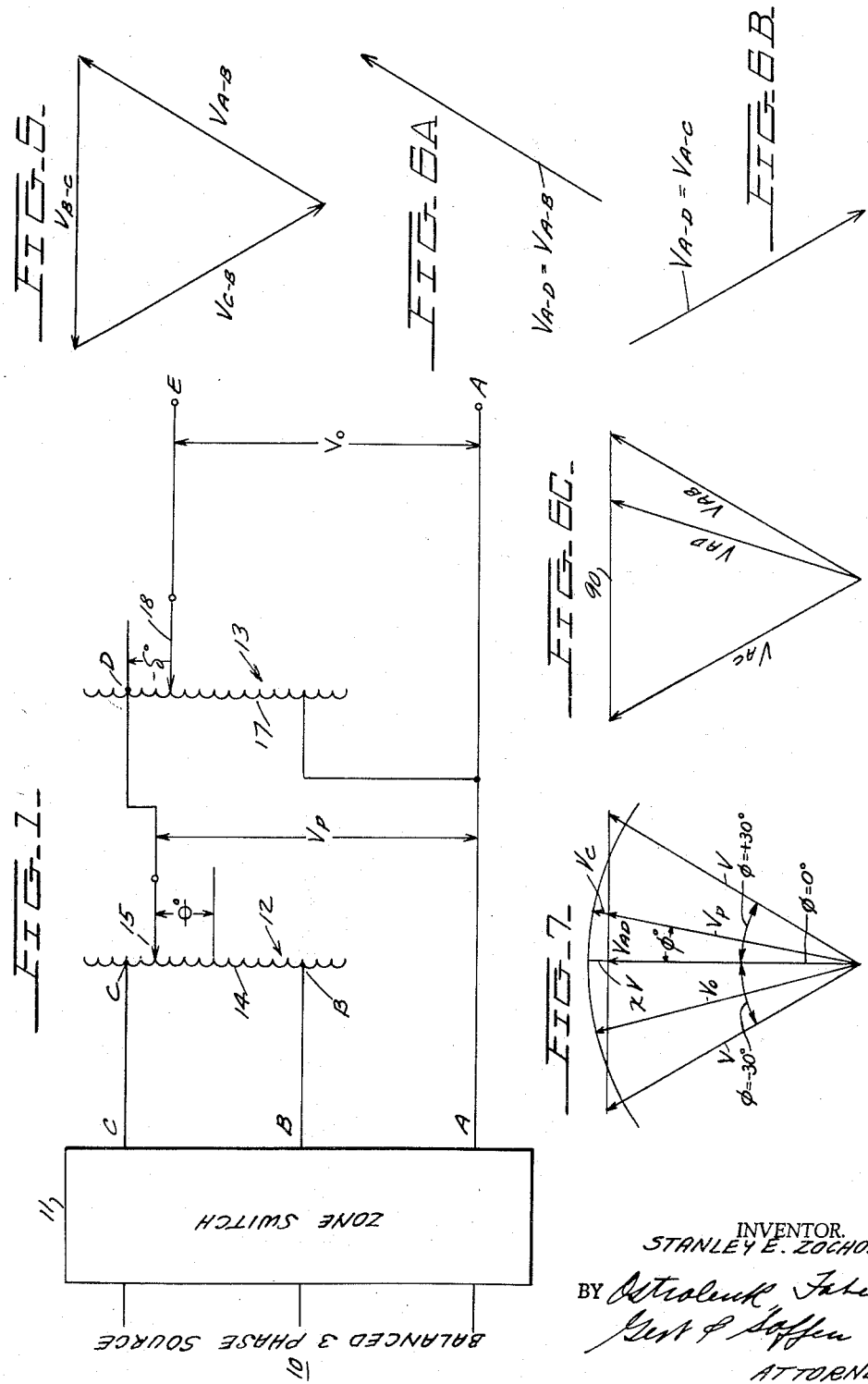
INVENTOR.
STANLEY E. ZOCHOLL
BY *(signature)*
ATTORNEYS Jan. 23, 1962 S. E. ZOCHOLL 3,018,434
BAR LINKAGE FOR VOLTAGE COMPENSATED PHASE SHIFTER
Filed Oct. 29, 1957 3 Sheets-Sheet 2
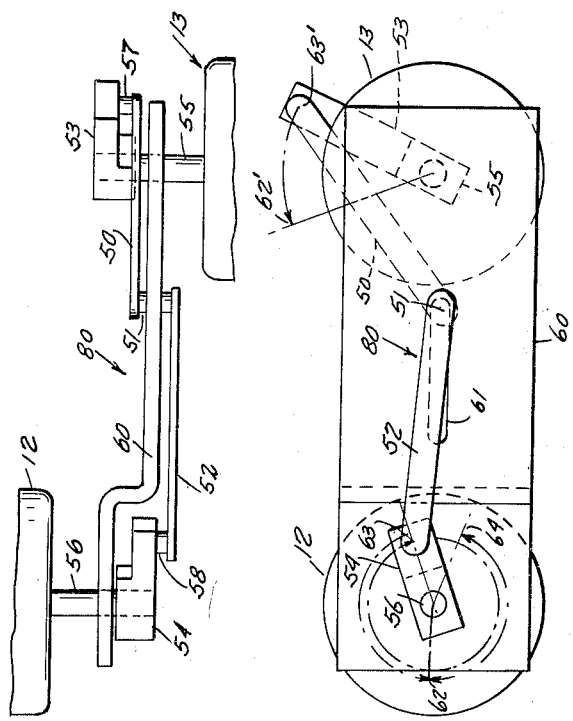
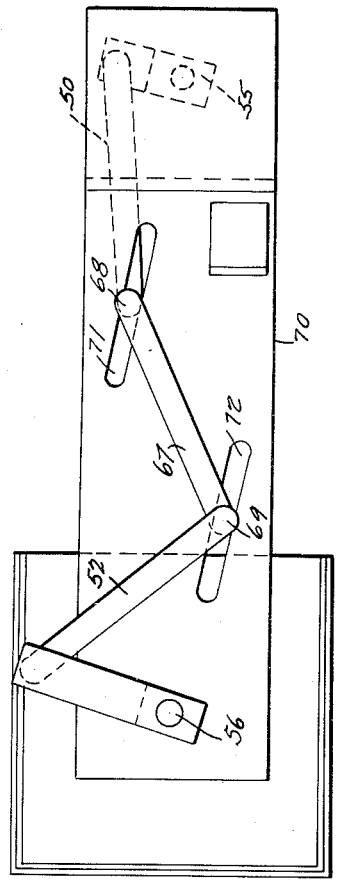
INVENTOR.
STANLEY E. ZOCHOLL
BY
ATTORNEYS

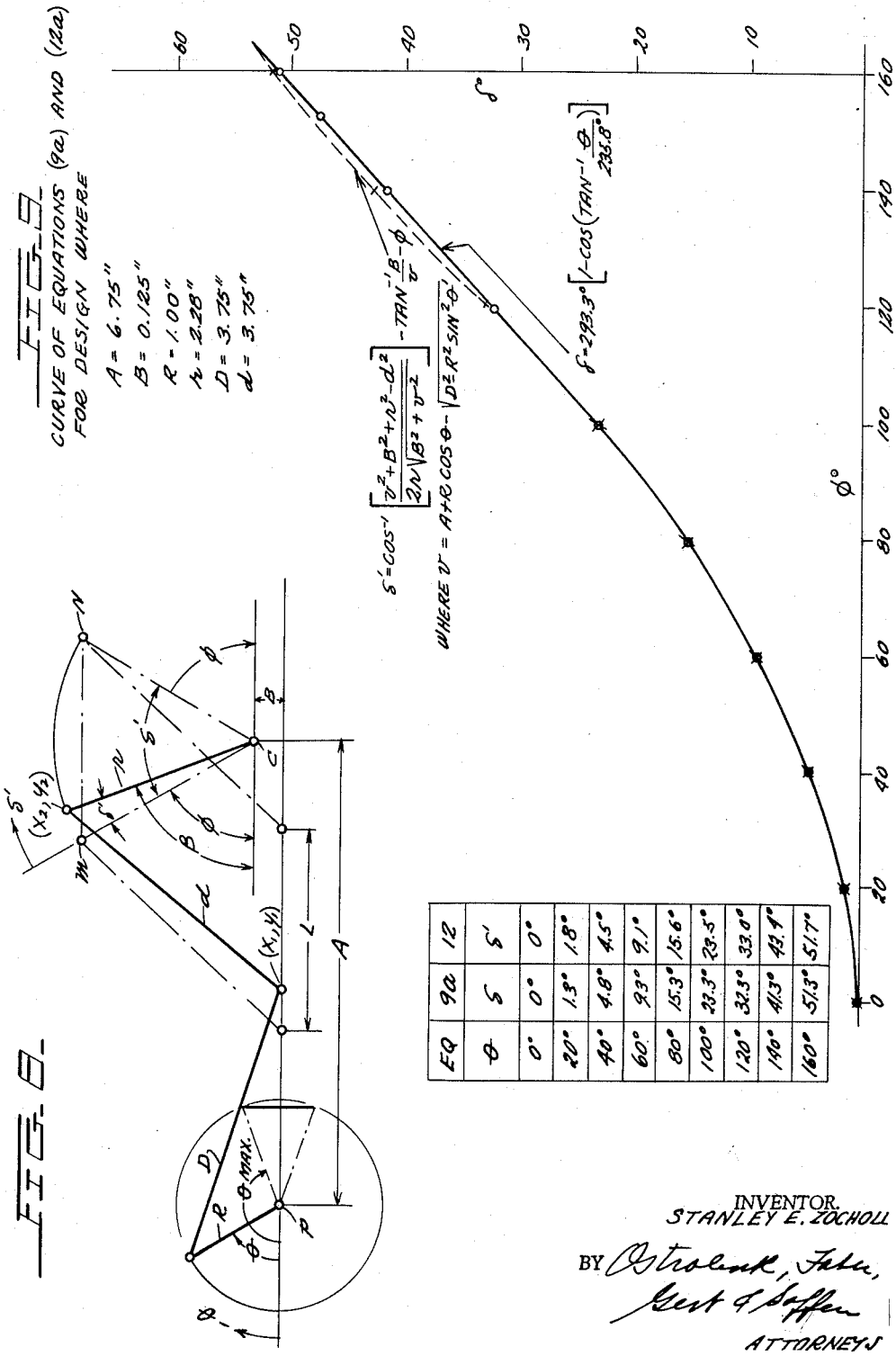

United States Patent Office 3,018,434
Patented Jan. 23, 1962

3,018,434
BAR LINKAGE FOR VOLTAGE COMPENSATED PHASE SHIFTER
Stanley E. Zocholl, Philadelphia, Pa., assignor to I-T-E Circuit Breaker Company, Philadelphia, Pa., a corporation of Pennsylvania
Filed Oct. 29, 1957, Ser. No. 693,063
3 Claims. (Cl. 323—120)

My invention relates to automatic voltage regulation means for phase shifters and is more particularly directed to a novel linkage whereby the voltage magnitude remains constant, regardless of the degree of phase shift.

In many circuit applications as for example, the portion of a network analyzer which simulates the generator or voltage source for the network, it is necessary to alter the phase angle of a single phase voltage and perform this function without a resulting variation in the magnitude of the voltage.

One means of phase shifting is achieved by a device known as an induction type phase shifter wherein three phase voltage is applied to a three phase wound stator. The variations of the vector angle of the single phase voltage output of the rotor is obtained by changing the relative position of the rotor with respect to the stator assembly.

A second means of phase shifing, to which my invention is particularly adaptable, embodies a continuously variable-ratio autotransformer wherein the transformer is energized by one phase of the voltage source. The phase shifted voltage output consists of a single phase voltage which is obtained between one conductor of the three phase source and a movable contact making brush of the autotransformer.

Although this continuously variable-ratio autotransformer has recently found wide application as a phase shifter it has limitations in many applications in that the magnitude of voltage does not remain constant for various phase shift angles. Thus, for example, if the voltage is of unity magnitude and 0° phase shift a subsequent change to 30° phase shift will result in a decrease of the voltage to 0.866 of unity.

In copending application Serial No. 433,098 filed May 28, 1954 now U.S. Patent 2,864,994 issued December 16, 1958 entitled "Phase Shifter with Automatic Voltage Compensation" to E. B. Phillips there is disclosed an arrangement whereby the output voltage magnitude is maintained constant regardless of the voltage phase shift. This is accomplished by means of a linkage which includes cam and follower means.

The instant invention accomplishes the electrical functions of the aforesaid U.S. Patent 2,864,994 by means of a simple two bar linkage which mechanically inter-relates a phase shifter variable-ratio autotransformer with a voltage compensating variable-ratio autotransformer without the necessity of cam or follower means. My novel linkage provides a construction which is inexpensive, is readily adjustable, and requires a minimum of space.

Accordingly, a primary object of my invention is to provide a novel voltage phase shifting device wherein the magnitude of voltage will remain constant irrespective of the degree of phase shift.

Still another object of my invention is the provision of continuously variable-ratio autotransformers which are electrically and mechanically inter-related wherein means automatically compensate variations in the voltage magnitude.

Still another object of my invention is to provide an electrical phase shifter which controls an automatic voltage compensating unit so that the magnitude of output voltage will be independent of the degree of phase shift.

A further object of my invention is to provide a two bar linkage which is less expensive, is more readily adjustable, and requires less space than means heretofore used to interconnect a pair of autotransformers so as to obtain a constant magnitude of output voltage for varying degrees of phase shift.

A still further object is to provide a linkage to mechanically coordinate two variable-ratio autotransformers such that the phase shifted voltage output therefrom remains at a constant value. This constant value may be above or below the phase voltage feeding the system as determined by the linkage construction thereby eliminating the need for a step-up or step-down transformer or other separate means for varying the magnitude of an A.C. voltage.

These as well as other objects of my invention will become apparent after reading the following description of the accompanying drawings in which:

FIGURE 1 is a circuit diagram of one embodiment of my invention illustrating the electrical interconnection between the phase shift and voltage compensating autotransformers.

FIGURE 2 is a side elevation of my two bar linkage which alters and transmits rotational movement of the phase shifter to the voltage compensating transformer.

FIGURE 3 is a plan view of the linkage of FIGURE 2.

FIGURE 4 is a side elevation illustrating a modification of my two bar linkage whereby the motion defined by the slot of FIGURE 2 is transferred by means of another bar of arbitrary length so that the distance between the autotransformer shafts can be varied within a reasonable range for convenience of mounting.

FIGURE 5 is a vector diagram illustrating the magnitude and phase relationship of the source voltage.

FIGURES 6a–6c illustrate the magnitude and phase shift of the phase shift auto-transformer prior to the compensation stage.

FIGURE 7 is a vector diagram illustrating the magnitude and phase angle of the voltages existing in the phase shift circuit and also illustrates the varying degrees of voltage compensation which is necessary to maintain the output voltage magnitude constant for all degrees of phase shift.

FIGURE 8 is a schematic representation of the two bar linkage illustrated in FIGURES 2 and 3.

FIGURE 9 is a graph illustrating a comparison between a typical graphic solution and a theoretical solution in obtaining the sizes and locations of the linkage components.

Referring now to FIGURE 1, the circuit is energized from a balanced three phase voltage source 10 through a rotary zone switch 11 to the three lines A, B and C. Thus, as illustrated in FIGURES 5 and 7 the voltages $V_{A-B}$, $V_{B-C}$ and $V_{C-A}$ are of equal magnitude and 120° from each other. It is an object of my invention to maintain the output voltage at terminals A and E constant in magnitude as the phase angle thereof is shifted.

To this end, I provide an automatic compensating variable-ratio auto-transformer 13. The phase shift auto-transformer 12 is comprised of the winding 14 and a brush 15 which is in sliding engagement with the winding 14 and fixed to voltage compensating transformer 13 at terminal D. By moving the brush 15 in a vertical plane the angle of the voltage $V_{A-D}$ can be varied through 60° with respect to voltage $V_{A-B}$. Thus, for example when the brush 15 is positioned at tap B the voltage $V_{A-D}$ will be equal in magnitude and have the same angle as the voltage $V_{A-B}$, as seen in FIGURE 6a. In like manner, when the brush 15 is positioned at tap C the voltage $V_{A-D}$ will have the same magnitude and phase angle as the voltage $V_{A-C}$ as seen in FIGURE 6b.

When the brush 15 of transformer 12 is positioned to rest on the tap of its winding 14 to which phase B is connected, the voltage $V_{A-D}$ is equal in magnitude and phase angle to the voltage $V_{AB}$ of the source. When the brush 15 is positioned to rest on the tap of its winding 14 which is connected to phase C of the source, the voltage $V_{A-D}$ is equal in magnitude and phase angle to the voltage $V_{AC}$. However, as seen in the vector diagram of FIGURE 6c that the voltage $V_{AD}$ has traveled through 60 electrical degrees when the brush 15 of transformer 12 has traveled from tap B to tap C. For all positions of the brush 15 along winding 14 the tip of the voltage $V_{AD}$ travels along line 90 connecting the tips of $V_{AB}$ and $V_{AC}$. As clearly seen in the vectorial diagram of FIGURE 6c and FIGURE 7 the magnitude of the voltage $V_{A-D}$ when the brush 15 is in a center position, thereby shifting the voltage $V_{A-D}$ 30° from the voltage $V_{A-B}$, will be decreased to 0.866 of its original magnitude.

With my novel arrangement I am able to compensate for this decrease in voltage, so that the output voltage will have a magnitude which is constant regardless of the degree of phase shift. This is achieved by means of the variable-ratio autotransformer 13. The voltage compensating autotransformer 13 is similar in construction to the phase shift autotransformer 12 and is provided with a winding 17 and a brush 18 in sliding engagement therewith. One tap D of compensating transformer 13 is connected to brush 15 while another tap is connected to output terminal A.

Vector diagram 6c has been redrawn in FIGURE 7 with the phase voltage $V_{AB}$ designated $V$ and the output voltage $V_{AD}$ designated $V_P$. The arc shown describes the path of the desired constant magnitude output voltage $V_O$ which may be any value between 0.866 V and V. $V_c$ is the voltage difference between $V_O$ and $V_P$. The factor $(x)$ is an arbitrary value between zero and 0.134. That is, when $V_O = V$ and the phase angle of the $V_O$ is at zero degrees $V_c = V(1-0.866) = 0.134V$. The factor $(x)$ can be chosen to be 0.134 in which case $V_P$ must be increased by the variable voltage $V_c$ at all values of phase angle except $-30°$ and $+30°$. When $(x)$ is zero, $V_P$ must be decreased by the variable voltage $V_c$ at all values of phase angle except $0°$.

In the following design computations $(x)$ is chosen to give an equal mechanical throw above and below tap D of winding 17 of the compensating transformer 13. The following design equations are based on continuously variable ratio autotransformers having a 320° mechanical throw and taps 136.15° from the midpoint of the throw. These conditions are convenient, but not mandatory to the principle to be illustrated.

The electrical phase angle $\phi$ is measured for convenience from the center of winding 14, which is 136.15° mechanical degrees from either tap BC of winding 14. This angle $\phi$ is shown on FIGURE 7. The voltage $V_P$ in terms of the source voltage $V$ is then $$V_p = \frac{.866V}{\cos \phi} \quad (1)$$

The increment of voltage $V_c$ required to bring $V_P$ to the required constant magnitude is then $$V_c = V_O - V_p$$

$$V_c = V\left[.866\frac{(\cos \phi - 1)}{(\cos \phi)} + x\right] \quad (2)$$

The voltage $V_{BD}$ indicated in the vector diagram FIGURE 7 is seen to be the voltage drop along winding 14 from phase B to brush 15. Since $V_{BD}$ equals $.866V$ tangent $\phi$ the mechanical angle $\theta$ of the transformer 12 is then obtained from the equation.

$$\frac{.866V \text{ Tan } \phi}{V} = \frac{\theta}{272.3} \quad (3)$$

therefore $$\theta = 235.8° \text{ Tan } \phi \quad (4)$$

The mechanical angle $\delta$ of compensating transformer 13 is measured for convenience from the tap D. Plus angles, indicated as angles above tap D, add amp-turns to the portion AD of winding 17 and minus angles indicated as angles below D, subtract amp-turns from portion AD. Therefore, $$\delta = \frac{V_c}{V_D} 272.3° \quad (5)$$

Substituting Equations 1 and 2 in Equation 5 gives:

$$\delta = \frac{V\left[.866\frac{(\cos \phi - 1)}{(\cos \phi)} + x\right]}{V\frac{(.866)}{(\cos \phi)}} 272.3° \quad (6)$$

Therefore:

$$\delta = \frac{.866(\cos \phi - 1) + x \cos \phi}{.866} 272.3° \quad (7)$$

Then $\delta$ as a function of $\theta$ to give constant magnitude to the output voltage is:

$$\tan^{-1}\frac{\theta}{235.8°} = \cos^{-1}\left[\frac{.866\frac{(\delta + 272.3°)}{(272.3°)}}{.866 + x}\right] \quad (8)$$

In order for the maximum value of plus $V_c$ to be equal to the maximum value of minus $V_c$, the factor $(x)$ must be chosen equal to 0.067. The maximum plus $\delta$ and maximum minus $\delta$ occur at equal to $0°$ and $\pm 30°$ respectively.

$$\delta = 293.3° \cos\left[\tan^{-1}\left(\frac{\theta}{235.8°}\right)\right] - 272.3° \quad (9)$$

This function can be obtained with a simple two bar linkage (FIGURES 2 and 3) with a linear slot to confine the center pin.

One end of link 50 is pivotally secured at pin 51 to one end of link 52. The other ends of links 50, 52 are pivotally connected at pins 57, 58 to cranks 53, 54 respectively which in turn are keyed to shafts 55, 56 respectively of autotransformers 13, 12. Brushes 15 and 18 are secured, in a conventional manner, to shafts 56, 55 respectively in order to vary the voltage outputs of autotransformers 13, 12 as shafts 55, 56 are rotated.

Plate 60 includes clearance openings for shafts 55, 56 as well as guide slot 61 for journaling. The movement of pin 51 which connects links 50 and 52. Linkages 50, 52 are so proportioned that slot 61 becomes a straight line slot as opposed to a curved slot.

Slot 61 is positioned on a line passing through point 62, which is midway between taps B and C of autotransformer winding 14, and the center of shaft 56. This arrangement assures that for both extreme positions 63 and 64 of crank 54, crank 53, hence brush 18 of autotransformer 13, will be at the same extreme angular position 63'. When crank 54 is in the mid-position 62 between positions 63 and 64, crank 53 is at its other extreme position 62'. Thus as shaft 56 is rotated, manually or by suitable power means, shaft 57 will be rotated nonlinearly through the two-bar linkage 80 in the proper relationship to maintain $V_O$ at a constant magnitude.

The coordinated rotation of shafts 55, 56 dictated by slot 61 may also be accomplished by adding a linkage of arbitrary length between the links of the two bar linkage of FIGURES 2 and 3 such that the distance between the autotransformer shafts 55, 56 can be varied within a reasonable range for convenience of mounting.

This arrangement is illustrated in FIGURE 4 which shows links 50 and 52 connected to link 67 at pins 68, 69 respectively. Plate 70 is provided with clearance holes for autotransformer shafts 55, 56. Parallel guide slots 71, 72 are cut through plate 70 for the journaling of pins 68, 69 so that the rotation of shafts 55, 56 will be mechanically coordinated in the relationship set forth in Equation 9 thereby maintaining the magnitude of $V_O$ constant for varying phase angles thereof.

The two bar linkage 60 of FIGURE 2 is schematically illustrated in FIGURE 8 together with the equation symbols necessary to derive the linkage 60 which will provide constant voltage with a changing phase shift.

Points P and C represent the centers, designated 56 and 55 respectively in FIGURE 2, of the autotransformers 12 and 13 respectively. A and B represent the distances locating point C with respect to point P. L is the length of slot 61. R and r are the lengths of the arms attached to the shafts of autotransformers 12 and 13 respectively. In FIGURE 2 arms R and r were designated 54 and 53 respectively. D and d, designated 52 and 50 respectively in FIGURE 2, are the lengths of the links. $\theta$ is the mechanical angle, thru which arm R rotates from the center line of autotransformer 12 as shown. $+\theta$ is measured in the clockwise direction while $-\theta$ is measured in the counterclockwise direction. $\delta'$ is the angle thru which the arm r rotates measured from M in the clockwise direction. $\phi$ is a constant angle which locates M the initial position of r. N locates the position of r when $\delta'$ is at its maximum value. $\beta$ is seen to equal $\delta'+\phi$.

The linkage of FIGURE 8 must give values of $\delta$ which agree with Equation 9. In order to agree with the above definition of $\delta'$, the coordinates of the equation 9 must be shifted as follows:

$$\delta' = 21° - \delta = 293.3°\left[1 - \cos\left(\tan^{-1}\frac{\theta}{235.8°}\right)\right] \quad (9a)$$

Defining the point $x_1, y_1$ on the slot and a corresponding point $x_2, y_2$ on the arc MN from point P as an origin, gives the following equations:

$$\begin{aligned}
x_1 &= -R\cos\theta + \sqrt{D^2 - R^2\sin^2\theta} \\
y_1 &= 0 \\
x_2 &= A - r\cos\beta \\
y_2 &= B + r\sin\beta \\
d^2 &= (x_2-x_1)^2 + (y_2-y_1)^2 \\
d^2 &= [A - r\cos\beta + R\cos\theta - \sqrt{D^2 - R^2\sin^2\theta}]^2 + [B + r\sin\beta]^2
\end{aligned} \quad (10)$$

solving for $\beta$ $$\beta = \cos^{-1}\left[\frac{v^2 + B^2 + r^2 - d^2}{2r\sqrt{B^2 + v^2}}\right] - \tan^{-1}\frac{B}{v} \quad (11)$$

where $v = (A + R\cos\theta - \sqrt{D^2 - R^2\sin^2\theta}$

Since $\beta = (\delta + \phi)$ $$\delta' = \cos^{-1}\left[\frac{v^2 + B^2 + r^2 - d^2}{2r\sqrt{B^2 + v^2}}\right] - \tan^{-1}\frac{B}{v} - \phi \quad (12)$$

Equating Equations 9a and 12 results in the following identity:

$$293.3°\left[1 - \cos\left(\tan^{-1}\frac{\theta}{235.8°}\right)\right]$$
$$= \cos^{-1}\left[\frac{v^2 + B^2 + r^2 - d^2}{2r\sqrt{B^2 + v^2}}\right] - \tan^{-1}\frac{B}{v} - \phi \quad (13)$$

The values of A, B, R, r, D and d must be proportioned so that the identity 13 holds acceptably for all values of $\theta$.

A, B and R may be considered limited by the space available in a particular design. Since $v$ of Equation 11 cannot be imaginary D must be greater than R.

When the value of R is assigned, the slot length L and the length of r is determined. For the autotransformer design resulting in Equation 9a.

$$L = R(1 - \cos\theta_{max}) - D + \sqrt{D^2 - R^2\sin^2\theta_{max}} \quad (14)$$

$$r = \frac{L}{2\sin\frac{(\delta' max)}{2}}$$

In order that $\delta'$ values repeat for values of $+\theta$ and $-\theta$ $$\phi = \frac{180° - \delta\,max}{2}$$

Because identity 13 necessitates the use of a trial and error procedure it is practical to design the linkage graphically obtaining values of $\delta'$ for corresponding values of $\theta$ from Equation 9a. The curve of FIGURE 9 shows the result of a typical graphic solution compared to the theoretical results of Equation 9a.

Thus, I have provided a simple two bar linkage construction for mechanically coordinating two variable-ratio autotransformers such that their combined voltage output remains constant in magnitude regardless of its phase angle.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. An electrical phase shift circuit having an input circuit and an output circuit, said input circuit being energized from a three phase voltage source, said electrical phase shift circuit being comprised of a phase shift transformer and a voltage compensating transformer, one phase of said three phase source energizing the primary winding of said phase shift transformer, said voltage compensating transformer energized by a second phase of said three phase source and by the secondary winding of said phase shift transformer, means to transmit non-linear motion to said voltage compensating transformer from said phase shift transformer, said means maintaining the magnitude of voltage at said output at a constant magnitude for all degrees of phase shift; said means comprising a plurality of links and movable pivots operatively connecting said plurality of links together; means for journaling the movement of said pivots comprising a straight slot for each of said movable pivots.

2. An electrical phase shift circuit having an input circuit and an output circuit, said input circuit being energized from a three phase voltage source, said electrical phase shift circuit being comprised of a phase shift transformer and a voltage compensating transformer, one phase of said three phase source energizing the primary winding of said phase shift transformer, said voltage compensating transformer energized by a second phase of said three phase source and by the secondary winding of said phase shift transformer, means to transmit non-linear motion to said voltage compensating transformer from said phase shift transformer, said means maintaining the magnitude of voltage at said output at a constant magnitude for all degrees of phase shift, said means comprising a two-bar linkage.

3. An electrical phase shift circuit having an input circuit and an output circuit, said input circuit being energized from a three phase voltage source, said electrical phase shift circuit being comprised of a phase shift transformer and a voltage compensating transformer, one phase of said three phase source energizing the primary winding of said phase shift transformer, said voltage compensating transformer energized by a second phase of said three phase source and by the secondary winding of said phase shift transformer, means to transmit non-linear motion to said voltage compensating transformer from said phase shift transformer, said means maintaining the magnitude of voltage at said output at a constant magnitude for all degrees of phase shift; said compensating and phase shift transformers both being auto-transformers comprising a winding, a brush, a shaft; said brush being operatively secured to said shaft for rotation thereby and operatively positioned in engagement with said winding; a first crank secured to the shaft of said phase shift transformer and a second crank secured to the shaft of said compensating transformer; a first and a second link pivotally secured to said first and second cranks respectively, said first and second cranks being pivotally connected to each other at a movable pivot point; means for confining the movement of said pivot point so that the shaft of said compensating transformer will oscillate as the shaft of said phase shift transformer is continuously rotated.

References Cited in the file of this patent
UNITED STATES PATENTS

| | | |
|---|---|---|
| 731,915 | Kloboucnik | June 23, 1903 |
| 1,873,777 | Mercereau et al. | Aug. 23, 1932 |
| 2,864,994 | Phillips | Dec. 16, 1958 |